Sept. 4, 1934.   S. B. BLAISDELL   1,972,755
LAMINATED ARTICLE
Filed May 23, 1931   2 Sheets-Sheet 2
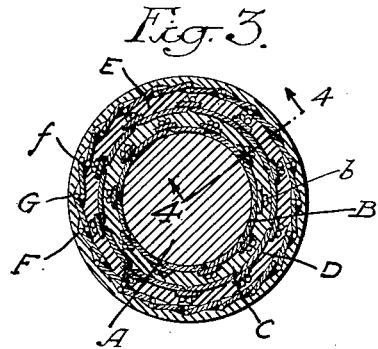
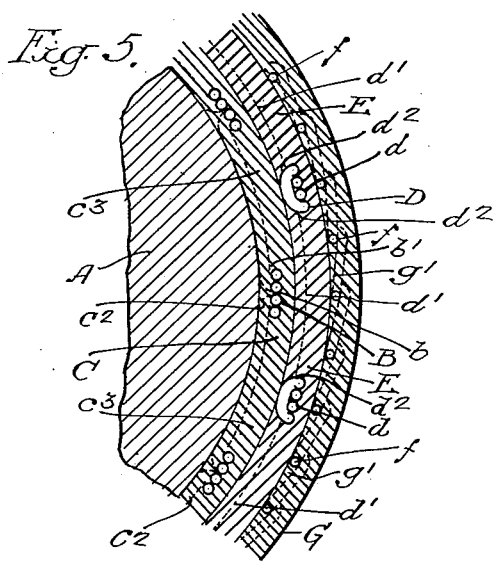
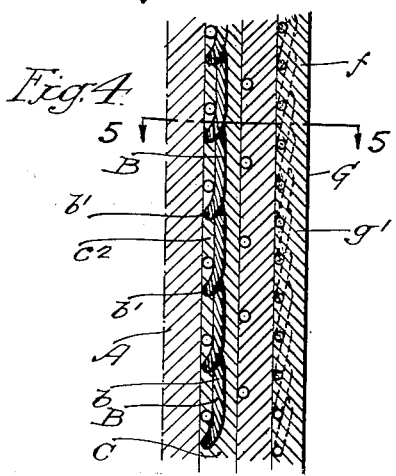
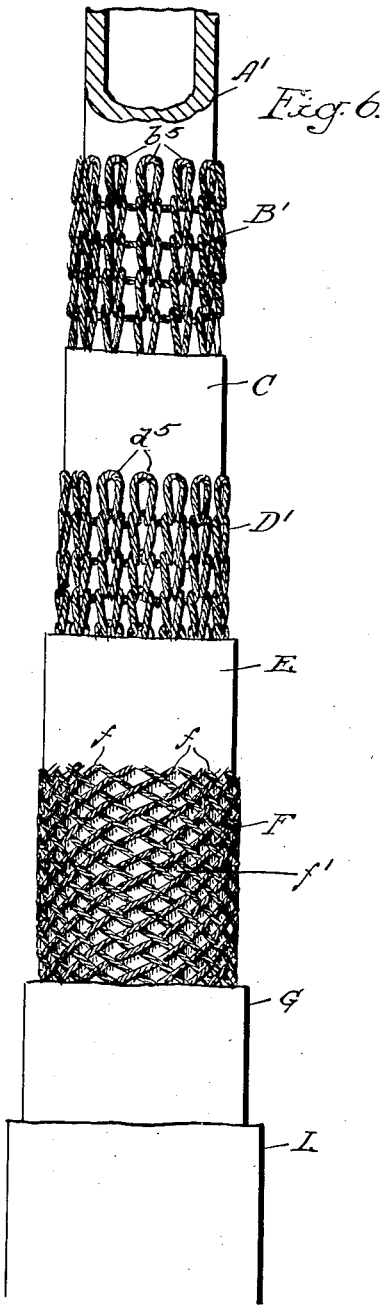
Inventor:
Sidney B. Blaisdell
by his Attorneys
Hanson & Hanson Patented Sept. 4, 1934

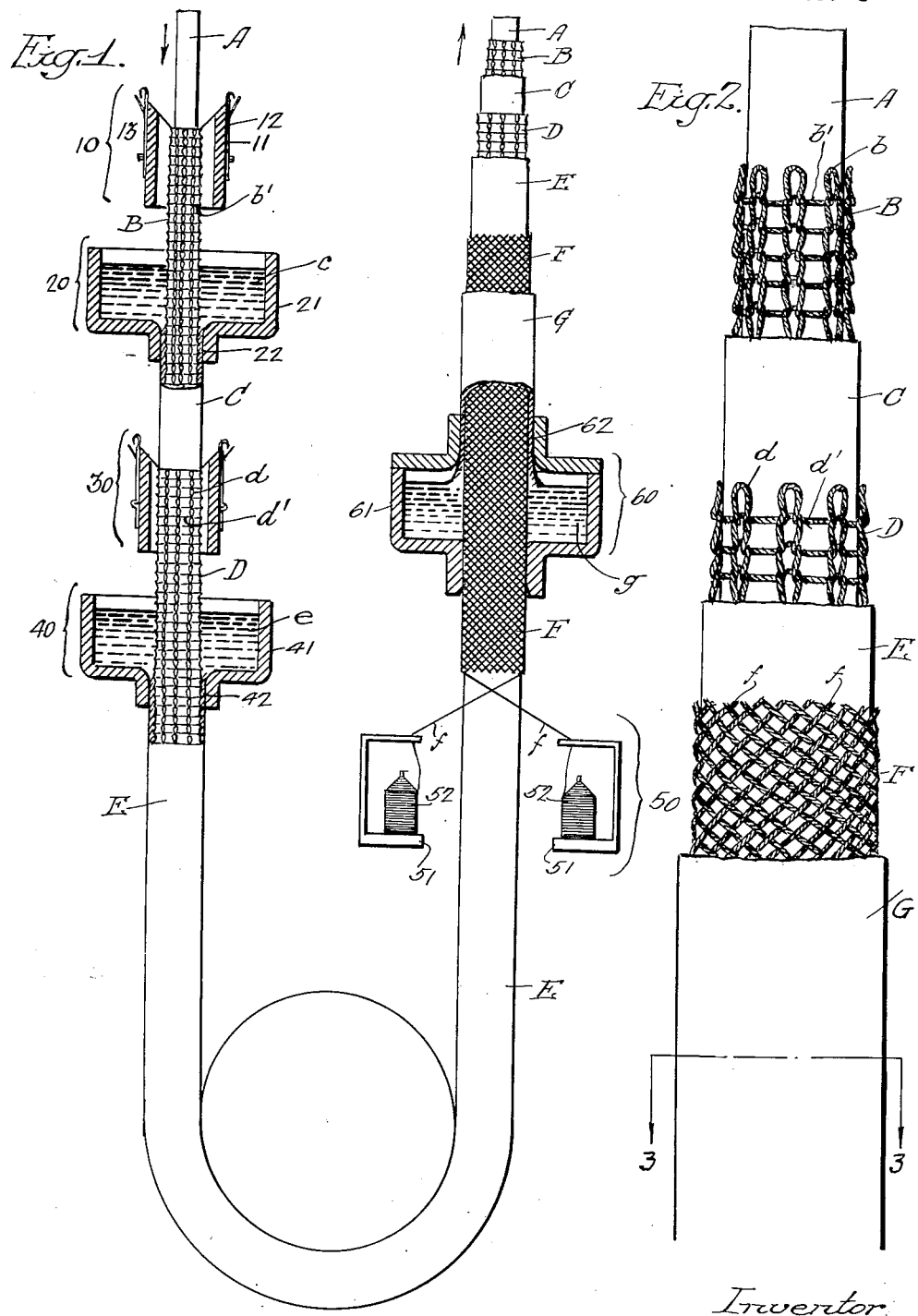

1,972,755

UNITED STATES PATENT OFFICE 1,972,755

LAMINATED ARTICLE

Sidney B. Blaisdell, Wyncote, Pa., assignor to Fidelity Machine Company, Wilmington, Del., a corporation of Delaware Application May 23, 1931, Serial No. 539,594

6 Claims. (Cl. 137—90)

This invention relates to a laminated structure and to the process of manufacture thereof, and particularly to a circular fabricated article of manufacture such as a moisture-proof cable, hose, etc., wherein a core element is encased within a plurality of successively applied textile coverings interspersed with layers of plastic material such as an asphalt product, rubber, etc. constituting a composite unit bonded together by the inherent adhesive qualities of the asphalt or raw rubber, or as an integral unit such as would be formed by subsequent vulcanization of the rubber, or by the "setting" of the asphalt product after fabrication of the laminated structure has been completed.

Prior to this invention the textile coverings employed in such articles have been composed entirely of braided tubes, necessitating the use of complicated and relatively expensive braiding machinery, which requires the constant attention of an operator for each machine employed to produce the individual articles. The braided tubes employed are of the relatively close weave and lie flat against the underlying layer of the article being fabricated and thereby present practically no means for gripping the layer of plastic substance subsequently applied.

One object of the present invention is to produce a circular fabricated structure wherein the textile coverings, at least in part, are formed of knitted fabric, the stitch wales of which constitute keys for the layer of plastic substance subsequently applied, whereby the said plastic substance is gripped or locked in place. In cases where asphalt or an asphaltic preparation is used the stitch wales of the knitted fabric are preferably spaced relatively far apart, the opposite edges of adjacent stitch wales forming a sort of dovetail connection between the textile covering and the superposed layer of asphalt. In cases where raw rubber is used the stitch wales are preferably spaced relatively close together for adding strength to the ultimate body, as the fabric becomes completely embedded in the rubber upon subsequent vulcanization thereof. This is particularly desirable in the manufacture of hose where radial strength is essential.

Another feature attending the use of tubular knitted fabric resides in the ability to use simple and relatively inexpensive automatic knitting machinery which requires very little of the operator's attention, thus making it possible for one attendant to run a number of machines.

One advantage in the use of the simple automatic circular knitting machine units resides in the compactness of the unit which takes up a relatively small amount of floor area.

Another feature attending the use of knitted fabric is the saving of thread as compared with the amount required for the formation of a corresponding braided tube as has been previously employed.

Other objects and advantages of the present invention and the details of construction and manufacture will be fully disclosed hereinafter, reference being had to the accompanying drawings, of which:

Fig. 1 is a diagrammatic sectional elevation illustrating one form of apparatus for fabricating a laminated structure in accordance with the principles of the present invention;

Fig. 2 is an enlarged elevation of an article after it is taken from the apparatus shown in Fig. 1 and showing portions of the various layers removed to permit the underlying layer to be seen;

Fig. 3 is a transverse section taken on the line 3—3, Fig. 2;

Fig. 4 is a fragmentary sectional elevation taken on the line 4—4, Fig. 3, and drawn to an enlarged scale;

Fig. 5 is a transverse sectional elevation taken on the line 5—5, Fig. 4; and

Fig. 6 is a view similar to Fig. 2, but showing the wales of the knitted tubes disposed in relatively close relation to each other, as in the manufacture of hose.

Referring to Fig. 1 of the drawings, A indicates a core element which in the present instance is shown as passing downwardly from a source of supply (not shown) and axially through a needle-supporting element 11 of a circular knitting unit 10, in which is disposed a series of angularly spaced needles 12. In the present instance the needle-supporting element 11 is shown as the cylinder of an ordinary circular knitting machine, wherein the needles are disposed in parallel relationship to the axis and on the outside of the cylinder through which the core element A passes. Obviously, the cylinder 11 may be replaced by a circular dial or plate having radially extending grooves in which the needles 12 may operate, without departing from the spirit of the invention. The knitting unit 10 is adapted to form a knitted tube B around the core element A, automatically, as the core element passes axially through the needle-supporting element 11.

As shown in Figs. 1 and 2, the knitted tube B comprises a plurality of substantially parallel longitudinally extending stitch wales $b$, which are angularly spaced around the core element A, as illustrated in Fig. 3, the stitch wales $b$ being connected by cross threads $b^1$ which pass from wale to wale in the formation of the courses of stitches constituting the wales $b$, these cross stitches $b^1$ producing a ladder effect between adjacent stitch wales and acting as a peripheral binding around the underlying core element A. From the knitting unit 10 the core element A with the primary fabric covering B thereon passes to and axially through a coating unit 20, which comprises a container 21 in which is maintained a body of plastic material $c$, which is to be applied in a layer completely enclosing and encircling the knitted fabric covering B, the container 21 being provided with an opening 22 through which the partly fabricated structure passes, the diameter of the opening 22 being such as to properly gauge and determine the thickness of the coating C as the partly fabricated structure passes therethrough.

The partly fabricated structure, comprising the core element A, the knitted fabric covering B, and the layer or coating of plastic material C, then passes through a second knitting unit 30 which corresponds in all respects to the knitting unit 10 and provides, around the layer of plastic material C, a knitted tubular structure D, which corresponds with the primary textile covering B as above noted, the stitch wales $d$ being spaced substantially the same as the stitch wales $b$ of the covering B and being connected by the cross threads $d^1$ in the general manner above noted.

From the knitting unit 30 the article, then comprising the core element A, textile covering B, plastic layer C and textile covering D, passes through another coating unit 40 which comprises a container 41 in which is located a body of plastic material $e$, the container being provided with an outlet or gauge opening 42 for determining the thickness of the coating E applied to the textile covering D.

From the coating unit 40 the partly fabricated structure, including the elements A, B, C, D and E, passes through a braiding unit 50, such as those commonly employed in the manufacture of articles of this kind at the present time, the braiding unit comprising a series of bobbin carriers 51 which move through serpentine paths around the article passing axially through the unit, each bobbin carrier 51 carrying a bobbin 52, the individual threads $f$ of which are, by the passing of the carriers in opposite directions through the serpentine paths noted, interbraided or interwoven with each other to produce the braided tube F around the outermost coating of plastic material E.

While this last-mentioned textile covering F is described as being of the braided character, obviously a knitted tube, such as B or D, may be employed, but in order to give the finished article the same general appearance as those now on the market it is preferred to use a common braided tube. The fabricated article, then constituted by the elements A, B, C, D, E and F, passes through a final coating unit 60 which comprises a container 61 containing a body of plastic material $g$ and provided with an outlet opening 62 which gauges the thickness of the final coating G, which is applied outside the fabric covering F and completes the fabrication of the article.

In the production of moisture-proof cables the core element A would consist of a cable, either in the form of a single wire or a plurality of strands assembled in such a manner as to produce a single core element such as illustrated at A, and the plastic substances $c$, $e$ and $g$ would be in the form of asphalt, an asphalt composition, or similar moisture-proof and electric insulating substance, in a plastic state, the containers 20, 40 and 60, if desired, being provided with any suitable means for maintaining the substance in a plastic state, such as steam jackets, electric heating coils or gas burners commonly employed for such purposes.

Upon referring to the enlarged views 4 and 5 particularly, it will be noted that the stitches $b$ of the tubular fabric B do not lie immediately against the underlying element A and consequently form keys or locking pockets into which portions of the plastic material $c$ pass, as illustrated at $c^2$, for example, in Figs. 4 and 5, the stitch wales $b$ acting as keys and providing a sort of dovetail locking connection for the coating C by the portions $c^2$ of the coating C passing under the stitches $b$, the ladder threads $b^1$ being embedded in the coating C and functioning as a means for preventing longitudinal movement between the coating and the textile covering B, while the wales $b$ extending longitudinally of the article act as keys and prevent circumferential relative movement between the coating C and the covering B. Thus, the coating C is maintained in fixed relation to the underlying core element A.

Upon reference to Figs. 3 and 5, it will be noted that the stitch wales $d$ of the textile covering D are disposed in positions between adjacent stitch wales $b$ of the underlying fabric covering B. This staggering of the wales $d$ with respect to the underlying wales $b$ produces an article void of longitudinal ridges and adds to the general effectiveness of the article, the wales D being disposed immediately outside the intermediate portions $c^3$ of the coating C which lie between the stitch wales $b$, $b$ of the fabric covering B, thus maintaining these intermediate portions $c^3$ against radial displacement, assisted by the ladder threads $d^1$ which connect the wales $d$, $d$. Fig. 5 further accentuates the dovetail connection between the coating E and the stitch wales $d$, the portions $d^2$ of the coating passing in and under the longitudinally extending stitch wales $d$.

As described with respect to the coating C as to how lateral and longitudinal displacement of the coating with respect to the textile covering B is prevented, the lateral and longitudinal displacement of the coating E with respect to the fabric covering D is effected in a like manner, radial displacement of the coating E being prevented by the woven or braided fabric F which moves a sort of network completely around the outside of the coating E. Relative displacement of the threads $f$ is prevented by portions $g^1$ of the outer coating G entering the openings $f^1$ formed by the interbraiding of the threads $f$, $f$. The outer coating G while maintaining the threads $f$, $f$ in spaced relation to each other provides a protective covering for the outer fabric covering F and increases the thickness of the insulation composed of the coatings C, E and F.

In the case of the manufacture of hose, such as common garden hose, the plastic material $c$, $e$ and $g$ will be in the form of raw rubber in a plastic state and may be maintained in the plastic state by any suitable heating means applied to the containers 21, 41 and 61 respectively.

In the production of the rubber hose the stitch wales $b^5$ of the covering $B^1$ and the stitch wales $d^5$ of the covering $D^1$ will be relatively close together and the core element, in place of being a cable, will take the form of a primary rubber tube illustrated at A¹ in Fig. 6.

In the instance of the manufacture of rubber hose, after the fabricated laminated structure leaves the last of the coating units it passes through a similar apparatus commonly used in the manufacture of hose and known as a leading machine, wherein an outer sheathing of lead, illustrated diagrammatically at L in Fig. 6, is applied to the outer coating of raw rubber G. After receiving the lead sheathing L the hose is taken to a vulcanizing apparatus wherein steam under pressure is admitted into the inner tubing A¹ and maintained under pressure therein for a given period of time, the heating of the steam within the inner tubing A¹ effecting vulcanization of the layers C, E and G with the inner tubing A¹ whereby the fabric coverings B¹, D¹ and F become embedded in a homogeneous mass of rubber and add the necessary strength to the hose to resist radial strains applied by fluid passing through the hose. After the vulcanization of the hose is completed the lead sheathing L is stripped from the finished article in the manner usual in the manufacture of hose. The close relationship of the wales $b^5$ and $d^5$ of the fabric tubes B¹ and D¹ add materially to the strength of the hose.

In either case, that is the manufacture of moisture-proof cables or the manufacture of hose, a material saving is effected by the use of the intermediate fabric tubes being constructed of knitted fabric in place of braided fabric as in the past, for the reasons above noted.

While but two intermediate fabric coverings have been described in the present instance, obviously any desired number of fabric coverings may be provided in a like manner with a layer of plastic material interspersed between the successively applied fabric coverings, for example, in the manufacture of hose it frequently occurs that six fabric layers are provided. However, as the operations of the knitting units are automatic the process of fabrication may be progressively carried on without interruption, regardless of the number of fabric tubes employed in producing the final product.

If desired the textile coverings may be formed around the core element in successive order without introducing plastic material therebetween and the fabricated article then submerged in a heated bath of plastic material for a period of time sufficient or necessary to permit the textile coverings to absorb the proper amount of the heated compound to provide, for example in the case of cables, the required insulation.

I claim:

1. A rubber hose comprising a rubber tube, and a tube of textile material substantially concentric with and imbedded in the rubber tube and comprising laterally spaced thread elements extending longitudinally of the hose and longitudinally spaced thread elements extending circumferentially of the hose and interlocked with the longitudinal thread elements to retain the said elements in said spaced relation to form and maintain openings in the textile tube and through which the rubber passes and integrally connects the rubber inside the textile tube with the rubber outside the textile tube.

2. A rubber hose comprising a rubber tube, and a knitted tube substantially concentric with and imbedded in the rubber tube and comprising laterally spaced stitch wales extending longitudinally of the hose and longitudinally spaced wale connecting threads extending circumferentially of the hose forming and maintaining sustantially uniformly spaced openings in the knitted tube through which the rubber passes and integrally connects the rubber inside the knitted tube with the rubber outside the knitted tube.

3. A rubber hose comprising a rubber tube and a plurality of knitted tubes disposed in substantially concentric radially spaced relation to each other and imbedded in the circular wall of the hose substantially concentric therewith, each knitted tube comprising laterally spaced stitch wales extending longitudinally of the hose, and longitudinally spaced wale-connecting threads extending circumferentially of the hose providing and maintaining substantially uniformly spaced openings in each of said knitted tubes through which the rubber extends and connects the rubber inside each knitted tube integrally to the rubber outside the knitted tube.

4. A rubber hose comprising a rubber tube and a plurality of knitted tubes disposed in substantially concentric radially spaced relation to each other and imbedded in the circular wall of the hose substantially concentric therewith, each knitted tube comprising laterally spaced stitch wales extending longitudinally of the hose with the wales of one knitted tube disposed in staggered relation to the wales of the next adjacent knitted tube, and longitudinally spaced wale-connecting threads extending circumferentially of the hose providing and maintaining substantially uniformly spaced openings in each of said knitted tubes through which the rubber extends and connects the rubber inside each knitted tube integrally to the rubber outside the knitted tube.

5. A rubber hose comprising a rubber tube and a plurality of knitted tubes disposed in substantially concentric radially spaced relation to each other and imbedded in the circular wall of the hose substantially concentric therewith, each knitted tube comprising laterally spaced stitch wales extending longitudinally of the hose, longitudinally spaced wale-connecting threads extending circumferentially of the hose providing and maintaining substantially uniformly spaced openings in each of said knitted tubes through which the rubber extends and connects the rubber inside each knitted tube integrally to the rubber outside the knitted tube, and a braided tube imbedded in the rubber tube in spaced relation to the outermost knitted tube.

6. A rubber hose comprising a rubber tube and a plurality of knitted tubes disposed in substantially concentric radially spaced relation to each other and imbedded in the circular wall of the hose substantially concentric therewith, each knitted tube comprising laterally spaced stitch wales extending longitudinally of the hose with the wales of one knitted tube disposed in staggered relation to the wales of the next adjacent knitted tube, longitudinally spaced wale-connecting threads extending circumferentially of the hose providing and maintaining substantially uniformly spaced openings in each of said knitted tubes through which the rubber extends and connects the rubber inside each knitted tube integrally to the rubber outside the knitted tube, and a braided tube imbedded in the rubber tube in spaced relation to the outermost knitted tube.

SIDNEY B. BLAISDELL.